United States Patent [19]

Anderson et al.

[11] Patent Number: 5,819,296

[45] Date of Patent: Oct. 6, 1998

[54] METHOD AND APPARATUS FOR MOVING LARGE NUMBERS OF DATA FILES BETWEEN COMPUTER SYSTEMS USING IMPORT AND EXPORT PROCESSES EMPLOYING A DIRECTORY OF FILE HANDLES

[75] Inventors: Raymond Arnold Anderson, Circle Pines; Ravi Tavakley, Burnsville, both of Minn.

[73] Assignee: VERITAS Software Corporation, Pleasanton, Calif.

[21] Appl. No.: 741,661

[22] Filed: Oct. 31, 1996

[51] Int. Cl.[6] .................................................. G06F 17/00
[52] U.S. Cl. .................... 707/204; 707/202; 707/204; 707/102; 707/205; 711/162; 711/4; 364/184
[58] Field of Search ............................... 364/184; 707/1, 707/202, 204, 102; 711/4, 162

[56] References Cited

U.S. PATENT DOCUMENTS

| 5,367,671 | 11/1994 | Fegenbaum et al. | 707/1 |
|---|---|---|---|
| 5,404,508 | 4/1995 | Konrad et al. | 707/202 |
| 5,438,674 | 8/1995 | Keele et al. | 711/4 |
| 5,455,926 | 10/1995 | Keele et al. | 711/4 |
| 5,544,347 | 8/1996 | Yanai et al. | 711/162 |
| 5,566,328 | 10/1996 | Eastep | 707/102 |
| 5,568,380 | 10/1996 | Brodnax et al. | 364/184 |
| 5,642,505 | 6/1997 | Fushimi | 707/204 |

*Primary Examiner*—Thomas G. Black
*Assistant Examiner*—Thuy Pardo
*Attorney, Agent, or Firm*—Carr & Ferrell LLP

[57] ABSTRACT

Large numbers of data files are moved between computer systems using an export process and an import process. To begin, a user specifies files to export from a first computer system. A volume location for each of the specified files is identified within the first computer system. File handles corresponding to the specified files are stored to a directory volume. Next, a user physically removes all of the identified volumes and the directory volume from the first computer system and installs them in the second computer system. The import process begins when a user for a second computer system loads the volumes and the directory volume into the second computer system. The imported files are then merged with existing files on the second computer system.

30 Claims, 11 Drawing Sheets

702 →

| Volume-ID | Volume Label |
|---|---|
| "1" | Vol 001 |
| "8" | Vol 008 |
| | |
| | |
| | |
| | |

504 — Volume-ID
506 — Volume Label

Second Computer System's
Volume Data Base (VolDB)
(Before Import)

| Computer-ID | File Pathname | File-ID | Volume-ID | Migration Level |
|---|---|---|---|---|
| 1001 | /dir3/fileA | 0001 | "1" | 1 |
| 1001 | /dir3/fileGenRpt | 0002 | "8" | 1 |
| | | | | |
| | | | | |
| | | | | |
| | | | | |

406 — Computer-ID
408 — File Pathname
410 — File-ID
412 — Volume-ID
414 — Migration Level Second Computer System's File Handle
Data Base (FHDB) (Before Import)

FIG. 6

Second Computer System's File Handle Data Base (FHDB) (After Import)

| Computer-ID | File Pathname | File-ID | Volume-ID | Migration Level |
|---|---|---|---|---|
| 1001 | /dir3/fileA | 0001 | "1" | 1 |
| 1001 | /dir3/fileGenRpt | 0002 | "8" | 1 |
| 1000 | /dir3/dir2/fileA | 0001 | "9" | 1 |
| 1000 | /dir3/dir2/fileB | 0002 | "10" | 1 |
| 1000 | /dir3/dir9/fileZ | 0481 | "11" | 4 |

FIG. 8

Second Computer System's Volume Data Base (VolDB) (After Import)

| Volume-ID | Volume Label |
|---|---|
| "1" | Vol 001 |
| "8" | Vol 008 |
| "9" | Vol 001 |
| "10" | Vol 002 |
| "11" | Vol 118 |

FIG. 9

METHOD AND APPARATUS FOR MOVING LARGE NUMBERS OF DATA FILES BETWEEN COMPUTER SYSTEMS USING IMPORT AND EXPORT PROCESSES EMPLOYING A DIRECTORY OF FILE HANDLES

BACKGROUND OF THE INVENTION

1. Field of the Invention

The present invention relates generally to systems and methods for enterprise data management and more particularly, for moving large numbers of data files between computer systems.

2. Description of the Background Art

Common to many enterprises today are computer systems with many gigabytes and even terabytes of data. Many large corporations collect and process massive quantities of data that often times needs to be transferred from one computer system to another. For example, in the oil industry many seismic tests are run all over the world by a single oil company. The resulting amount of raw data enters into the terabyte range. This data is then moved to a few regional centers for processing. Storing this data at several locations and moving it around is an expensive and time consuming process. Since it is too expensive to store that amount of data on hard disk drives, companies are choosing instead to migrate most of that data to less expensive storage devices such as tape libraries or optical jukeboxes. In addition to being less expensive, the tapes and optical disks are easier to move from place to place. Migration is defined as the process of moving files from one storage resource to another. Current products such as AXXiON-HSM, developed by OpenVision, Inc. (headquarters in Pleasanton, Calif.), are designed specifically for this purpose. Normally, the AXXiON-HSM migrates least-used files on disk drives to less expensive magnetic tapes.

Typically a computer system contains very expensive disk drives filled with a few gigabytes of regularly used files, and less expensive tape drives filled with terabytes of seldom used files. A problem arises when a user is called upon to transfer several terabytes of data from one computer system to another. Returning to the oil industry example, this may occur when a petroleum engineer in Los Angeles needs to evaluate all the seismic data taken in several tracts of land in west Texas and currently residing on a computer system in Houston. Such a data transfer between sites may require copying thousands of files.

Conventional methods for transferring this much data from a first computer system to a second computer system requires reading migrated data from tape to disk and then copying the data to a second set of tapes. The second set of tapes is then transferred to the second computer system, which then stores the data on its disk drives. Because of the very large volume of data, the second computer system often must migrate the newly loaded data to it's own set of tapes.

The entire process of transferring terabytes of data from one computer system to another may take weeks. Therefore, what is needed is a system and method for reducing the time required to transfer migrated files between computer systems.

SUMMARY OF THE INVENTION

The present invention is a system and method for moving large numbers of data files between computer systems. Within the system of the present invention, a migration module transfers files from a primary storage to a secondary storage and as a result frees-up more disk space on the primary storage. After migration, the primary storage retains information about those files which have been migrated to secondary storage. The secondary storage contains the migrated files. When a user desires to transfer files from a first computer system to a second computer system, a module of the present invention on the first computer system is used.

The export module copies each migrated file's "file handle" to a directory volume but does not read the migrated files themselves during the copying step. The "file handle" is comprised of a computer-ID, a file pathname, a file-ID, a volume-ID and a volume label. After the export routine is performed, a user physically transfers those volumes containing migrated files from the first computer system to the second computer system. An import module on the second computer system merges the computer-ID, file pathname, file-ID, and volume-ID and volume label assigned to each imported file with corresponding information on those migrated files already present within the second computer system.

Within the method of the present invention, a user selects files to be exported from the first computer system. The method identifies which volumes in the secondary storage contain the selected files. The method then copies to a directory volume a computer-ID, file pathname, file-ID, and volume-ID, volume label, user name and user permission lists corresponding to each migrated file to be exported, but does not actually read the migrated files themselves. Next, the method instructs a user to transfer the directory volume and the identified volumes from the first computer system to a second computer system. The method on the second computer system then merges the computer-ID, file pathname, file-ID, and volume-ID and volume label of the exported migrated files with the migrated files already in existence on the second computer system. Finally the method loads the user names and permission lists into primary storage for each migrated file and the files are ready to be accessed on the second computer system.

According to the system and the method described, the migrated files are not brought back into the primary memory during either export or import, and thus the time required to transfer the files between computer systems is reduced.

BRIEF DESCRIPTION OF THE DRAWINGS

FIGS. 6&7 are a memory map of a files within a FHDB and a VOLDB just before an import operation into a second computer system;

FIGS. 8&9 are a memory map of a files within a FHDB and a VOLDB just after an import operation into the second computer system;

DETAILED DESCRIPTION OF THE PREFERRED EMBODIMENT

Figure 1:
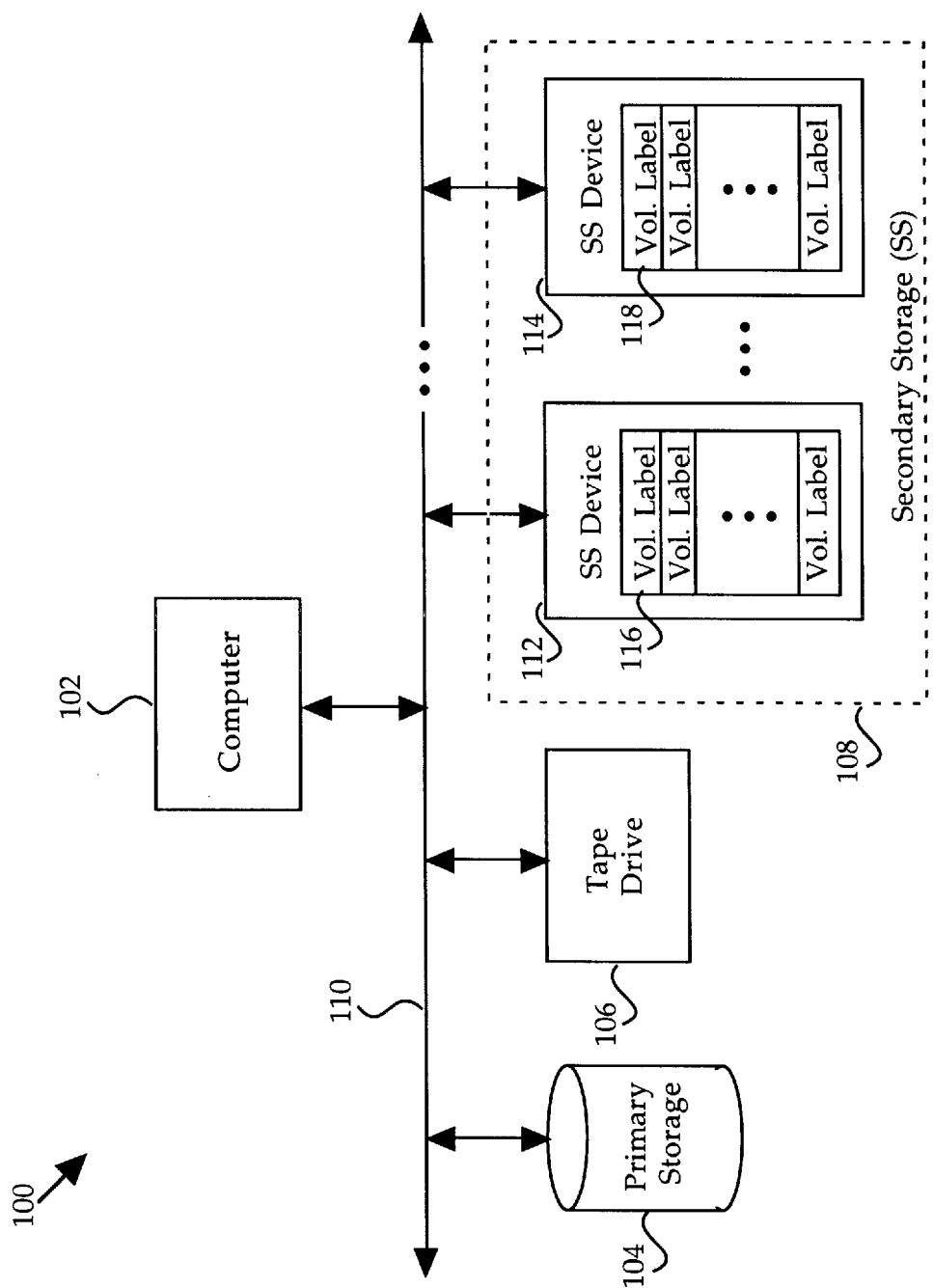
FIG. 1 is a block diagram of a system for moving large numbers of data files between computer systems.

FIG. 1 is a block diagram illustrating a system 100 for moving large numbers of data files between computer systems. The system 100 comprises a computer 102, a primary storage device 104, a tape drive 106 and secondary storage (SS) 108, each coupled to bus 110. The computer 102 is comparable in capabilities to a SPARCcenter 2000 machines, manufactured by Sun Microsystems of Mountain View, Calif. The SPARCcenter 2000 machines run Solaris, a UNIX based multitasking operating system available from SunSoft Corp. The computer 102 controls the flow of data between the primary storage device 104, the secondary storage 108, and the tape drive 106. Additional information about the computer is provided below with respect to FIG. 2.

The primary storage device 104 is a high-speed non-volatile information storage device, such as a magnetic disk drive, for storing files that are regularly accessed by the computer 102. The tape drive 106 provides for storage of data on magnetic tape. The secondary storage 108 is non-volatile storage device capable of storing at relatively low-cost large volumes of seldom used data. The secondary storage 108 is comprised of secondary storage devices 112 through 114. The secondary storage devices 112, 114 are coupled to the bus 110 and can be tape drives, tape stackers, tape carousels and/or optical jukeboxes. The SS devices 112, 114 include removable volumes 116, 118, each volume uniquely identified by a volume label. There is one unique volume label for each volume within the secondary storage 108. The SS devices 112, 114 are tape libraries and each volume is a tape.

Figure 2:
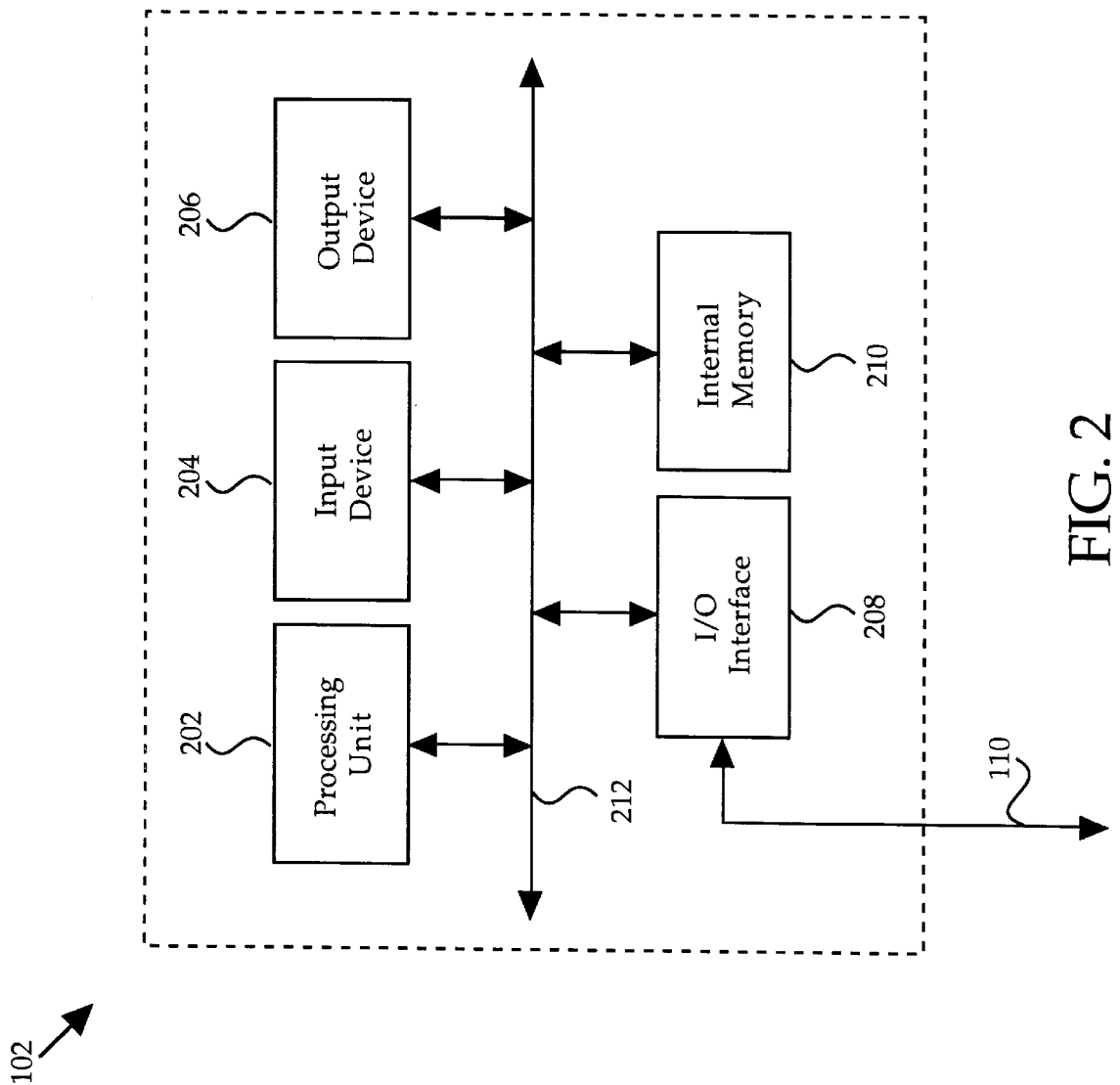
FIG. 2 is a block diagram of a computer within the system of FIG. 1.

FIG. 2 is a block diagram of the computer 102 within the system 100 of FIG. 1. The computer 102 includes a processing unit 202, an input device 204, an output device 206, a I/O interface 208, and an internal memory 210, each coupled via a bus 212. Elements 202, 204, 206, 208 and 212 are conventionally known. The internal memory 210, however, contains program instructions which are not conventionally known.

The processing unit 202 executes program instructions stored in the internal memory 210. The input device 204 includes a keyboard and mouse for enabling the processing unit 202 to interpret commands and data entered by a user. The output device 206 is a display monitor for displaying information received from the processing unit 202. The I/O interface 208 is coupled to the bus 110 and provides an interface for passing information to and withdrawing information from the primary storage device 104, the tape drive 106, and the secondary storage 108.

The internal memory 210 stores computer readable program instructions for controlling how the processing unit 202 accesses, transforms and outputs data, as is described in detail below with reference to FIG. 3. The internal memory 210 comprises both a volatile and a non-volatile portion. Those skilled in the art will recognize that the internal memory 210 could be supplemented with other computer usable storage media, including a compact disk, a magnetic drive or a dynamic random access memory.

Figure 3:
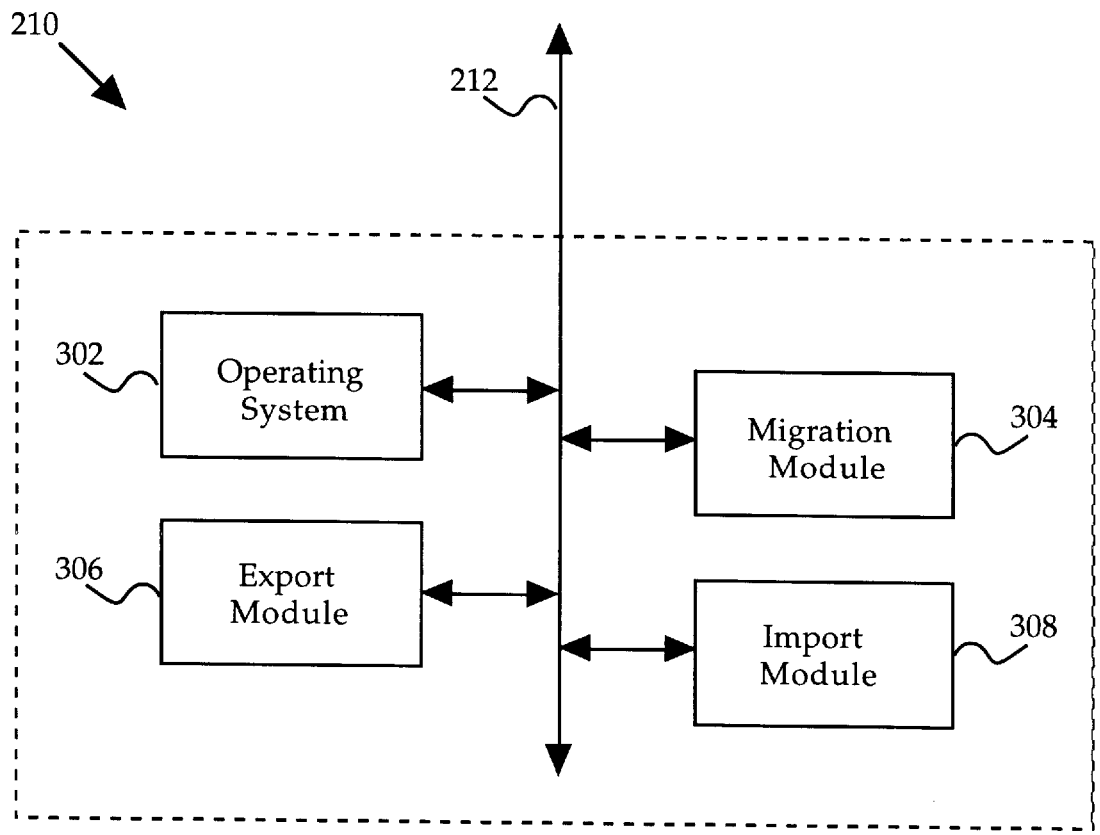
FIG. 3 is a block diagram of an internal memory within the computer of FIG. 2.

FIG. 3 is a block diagram of the internal memory 210 within the computer 102 of FIG. 2. The internal memory 210 stores an operating system 408, a migration module 304, an export module 306 and an import module 308, each includes both program instructions and data.

The operating system 302 is a UNIX based multitasking operating system, for controlling the configuration and usage of the computer's 102 hardware and software resources. The operating system 302 also copies files between the primary storage device 104 and the tape drive 106 at the request of a user. In addition, the operating system 302 maintains a conventionally known UNIX "inode" which contains a "name space" on every file that is stored within the system 100. The "name space" includes the name of the file, the size of the file, the file's ownership and the file's user access permission lists.

The migration module 304 transfers the least-recently used files from the primary storage device 104 to the secondary storage 108. The export module 306 copies from the primary storage device 104 to the tape drive 106 information pertaining to files to be exported. The import module 308 copies from the tape drive 106 into the primary storage device 104 information pertaining to files to be imported. Detailed operation of the migration module 304, the export module 306, and the import module 308 is described below.

Figures 4, 5:
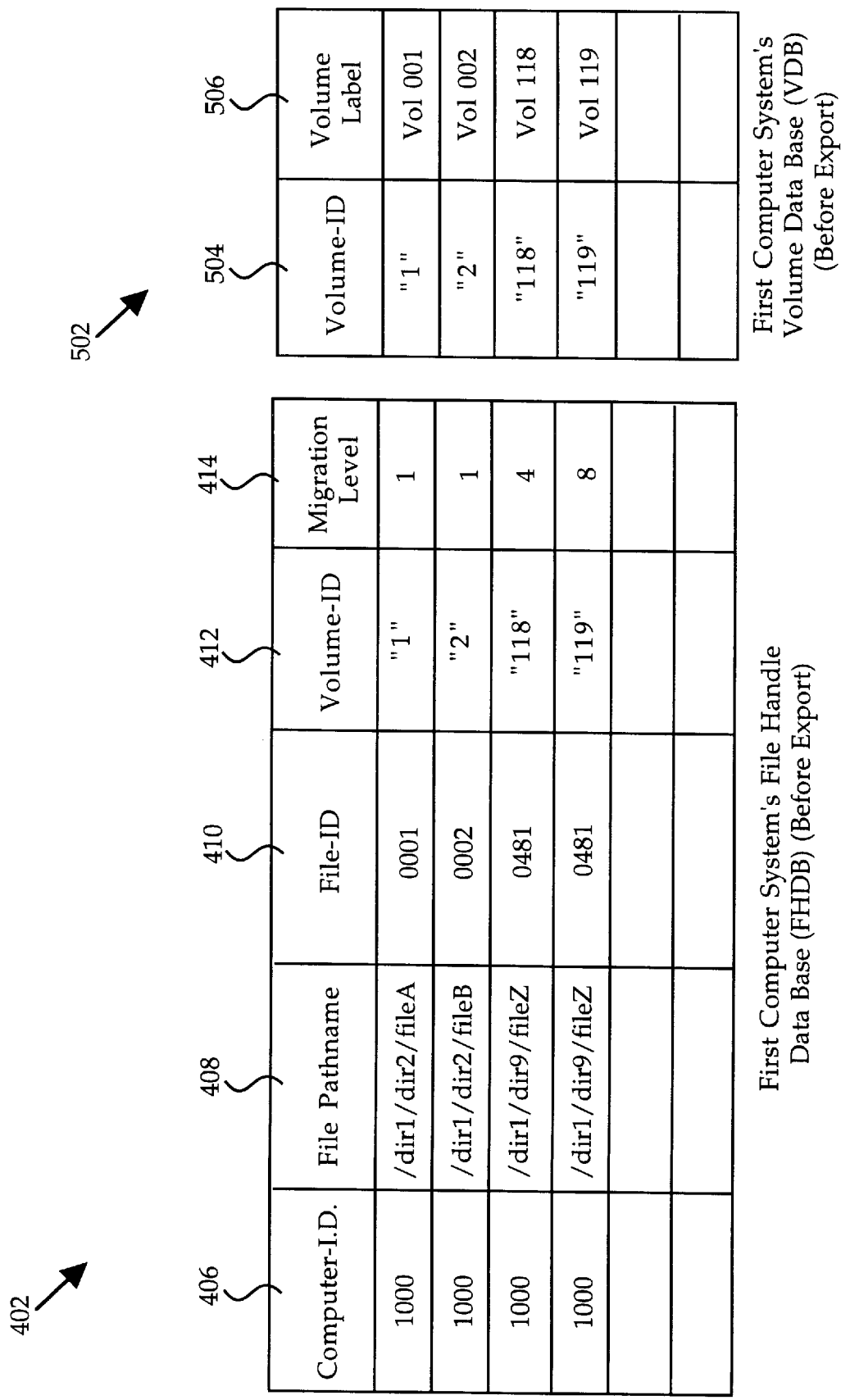
FIGS. 4&5 are a memory map of a File Handle DataBase (FHDB) and a Volume DataBase (VOLDB) containing files to be exported from a first computer system.

FIGS. 4&5 are a memory map of a File Handle DataBase (FHDB) 402 and a VOLume DataBase (VOLDB) 502 identifying migrated files. The FHDB 402 keeps a record of and manages all of the files which have been migrated from the primary storage device 104 to the secondary storage 108. The VOLDB 502 keeps a record of and manages all of the volumes that contain the migrated files. One volume may contains thousands of files. Files that have not been migrated from the primary storage device 104 (i.e. "non-migrated" files) are not referenced within either database 402, 502, but are instead handled by the operating system 302 in a conventional manner.

The FHDB 402 includes data fields labeled as a computer-identification (ID) 406, a file pathname 408, a file-ID 410, a volume-ID 412 and a migration level 414. The computer-ID 406 uniquely identifies which computer system that a migrated file was originally stored on and never changes for the life of the file. For example, the computer-ID 406 is "1000" and refers to a first computer system. The file pathname 408 identifies under which primary storage device 104 root directory and subdirectories the migrated file is referenced. The file pathname's 408 root directory (i.e. "dir1") changes when a migrated file is imported into a different computer system; however, any subdirectories (i.e. "dir2") or file names (i.e. "fileA") remain the same. The file-ID 410 in combination with the computer-ID 406 uniquely identify each migrated file and never changes for the life of the file. The volume-ID 412 uniquely identifies which volume in the volumes 116, 118 contains the migrated file. The migration level 414 identifies a migration level at which a file is stored within the secondary storage 108. Preferably, only files at the same migration level 414 may exist within the same volume 412.

The VOLDB 502 includes data fields labeled as a volume-ID 504 and a volume label 506. The volume-IDs 504 have corresponding volume-IDs 412 in the FHDB 402. The volume label 506 corresponds to a physical label placed on the volumes 116, 118, which a user may use to identify a particular volume. FIG. 4 shows three migrated files (i.e. "fileA," "fileB" and "fileZ") within the first computer system that may be exported to a different computer system.

Two copies of "fileZ" are shown to illustrate that during migration, duplicate copies of a file may be stored within the secondary storage 108 and at different migration levels 414.

FIGS. 6&7 are a memory map of a FHDB 602 and a VOLDB 702 prior to an import operation into a second computer system. The data fields 406 through 506 perform the same function as described with reference to FIG. 4. In the example shown, the second computer system currently is storing two migrated files within its secondary storage 108. The computer-ID 406 of the second computer system is "1001" and currently all files are stored within root directory "dir3."

FIGS. 8&9 are a memory map of FHDB 802 and a VOLDB 902 just after an import operation into the second computer system. The data fields 406 through 506 within the FHDB 802 and VOLDB 902 after an import operation perform the same function as described with reference to FIG. 4. For example, FIG. 6 shows how the three exported files from the first computer system (shown in FIG. 4) have been merged with the two migrated files within the second computer system (shown in FIG. 5). Thus, a migrated file on the first computer system remains a migrated file on the second computer system. Additional details describing interaction of the data fields 406 through 506 with the programs stored in the internal memory 210 are provided below.

Figure 10:
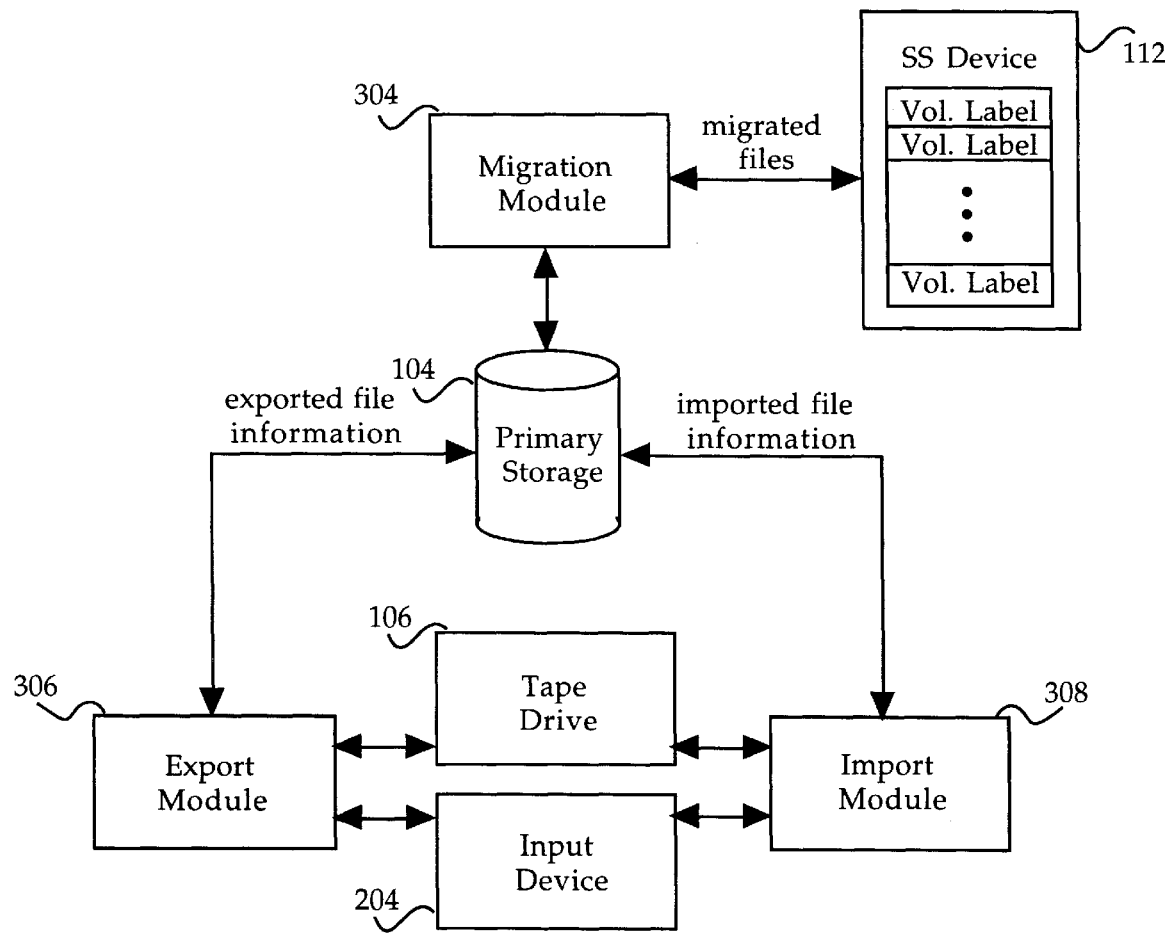
FIG. 10 is a dataflow diagram of how the present invention's software interacts with the system's hardware.

FIG. 10 is a dataflow diagram of how the present invention's software interacts with the system's 100 hardware. The migration module 304 transfers files from the primary storage device 104 to the SS device 112, thereby freeing disk space on the primary storage device 104 for other uses. Only those files which are leastrecently accessed by a user are migrated to the SS device 112. As part of the migration process, the migration module 304 makes one or more user specified copies of each file being migrated. Multiple file copies allow for the computer system 100 to maintain a copy of the file even though one copy is being exported.

Up to eight migration levels are supported by the migration module 304. The migration level of a file relates to the last access made to the file. A file having a higher migration level would have been accessed less recently than a file with a lower migration level. For example, if a file has not be accessed by any user in ten years, the file is stored at a higher migration level, such as migration level eight. However, if a file was last accessed a year ago, the file is stored at a lower migration level, such as migration level four. The migration level at which a file is stored is independent of the SS device 112, 114 upon which the file is located. Thus a SS device 112, 114 may have files from various migration levels stored within its volumes 116, 118. However, each volume 116, 118 may only store files at the same migration level.

Whenever a file is migrated, the migration module 304 creates an entry for that file within the FHDB 402 and the VOLDB 502, indicating which volume in the VOLDB 502 is used. For example, referring to FIG. 4, to migrate "fileZ" stored on migration level 414 "4" from primary storage device 104 to the SS device 112, the migration module 304 queries the operating system 302 and determines that "fileZ's" computer-ID 406 is "1000," file pathname 408 is "/dir1/dir9/fileZ," file-ID 410 is "0481," volume-ID 412, 504 is "118", and volume-label 506 is "Vol 118". Migration is performed by products such as AXXiON-HSM, developed by Open Vision (headquarters in Pleasanton, Calif.).

The export module 306 performs all functions associated with exporting a user specified files on the computer system 100. For the purposes of the discussion that follows, a first computer system's files are being exported to a second computer system. Two types of export are available. In the first export type, all files having a user specified migration level are exported. In the second export type, all files located within a directory are exported.

Beginning with the first export type, the export module 306 receives a user command from the input device 204 specifying a migration level on the first computer system for which export is desired. In response, the export module 306 identifies from the FHDB 402 which volumes within the secondary storage 108 of the first computer system contain files at the specified migration level 414. The export module 306 then creates a file on a directory volume in tape drive 106 and copies to the file the computer-ID 406, file pathname 408, file-ID 410, and volume-ID 412 from the FHDB 402 and the volume-ID 504 and volume label 506 from the VOLDB 502. The export module 306 also copies to the directory volume user names and file access permission lists associated with the migrated files being exported and maintained by the operating system 302. As is conventionally known, a file's "user name" indicates which users have created the file. A file's "access permission lists" indicate which users may read, modify or execute the file. The export module 306 does not read the migrated files themselves during this copying step, thereby saving time in the export process. Instead, the data associated with the migrated files remains on the respective volumes in the first computer system's secondary storage 108. The export module 306 generates a list of volumelabels 506 retrieved from the VOLDB 502, for the files being exported. The list is sent to the output device 206 so that a user knows which volumes to physically remove from the SS devices 112, 114. For the exported files, the export module 306 deletes from the FHDB 402 and the VOLDB 502 the computer-ID 406, the file pathname 408, the file-ID 410, the volume-ID 412, 504, the volume label 506 and the migration level 414. At this juncture the export module 306 has completed its operations, and the user may physically remove on the first computer system the directory volume from the tape drive 106 and the indicated volumes 116, 118 from the SS devices 112, 114. The user may then send the directory volume and volumes to the second computer system.

Those skilled in the art will recognize that some of the functions performed by the export module 306 may be performed by a Tape ARchive (TAR) command (in UNIX based systems) or by other industry standard tape exchange formats well known to those skilled in the art. All files stored within the secondary storage 108 and copied to a directory volume in the tape drive 106 are in TAR format.

The processing for the second export type is activated when the export module 306 on the first computer system receives a user command from the input device 204 specifying a directory. The command also specifies a migration level 414 to assign to the files being exported from the specified directory. In response, the export module 306 generates a duplicate copy of all migrated files within the specified directories on the first computer system and stores the files in the secondary storage 108 at the assigned migration level. Next, the export module 306 identifies within the specified directories on the first computer system the nonmigrated files in the primary storage device 104 and the volumes containing migrated files in secondary storage 108. The export module 306 then creates a file on a directory volume and copies the file entries in the FHDB 402 and VOLDB 502 corresponding to the duplicate migrated files, in the same manner as that described for the first export type.

After generating a volume label 506 list for all the volumes to be pulled from the secondary storage 108, the export module 306 deletes the duplicate entries for the migrated files located in the FHDB 402 and the VOLDB 502. Next, the export module 306 copies from primary storage device 104 to a directory volume in the tape drive 106 any non-migrated files within the specified directories. Then the export module 306 copies to the directory volume user names and permission lists, maintained by the operating system, for both the migrated and non-migrated files. At this juncture the export module 306 has completed its operations and the user may physically remove on the first computer system the directory volume from the tape drive 106 and the indicated volumes 116, 118 from the SS devices 112, 114. The user may then send the directory volume and volumes to the second computer system.

The import process begins when a user receives a directory volume containing a FHDB 402, a VOLDB 502, non-migrated files, and associated user names and permission lists, and volumes containing the migrated files. Next, the user loads the volumes into the second computer system's secondary storage 108 and loads the directory volume into the second computer system's tape drive 106. At this juncture, the import module 308 is activated and merges the imported FHDB 402 and VOLDB 502 with the second computer system's currently existing FHDB 602 and VOLDB 702. FIGS. 8&9 show an example of the FHDB 802 and VOLDB 902 after merging the three files exported from the first computer system, as shown in FIGS. 4&5 and two currently existing files on the second computer system, as shown in FIGS. 6&7. The import module 308 performs the merge operation by first reading from the tape drive 106 the computer-ID 406, file pathname 408, and file-ID 410 of the migrated files to be imported into the FHDB 602. The import module 308 also loads the imported files' volume labels 506 into the VOLDB 702. For example, FIGS. 8&9 show how the computer-IDs 406, the file pathnames 408, file-IDs 410, and the volume labels 506 are carried over from the first computer system.

The imported file's original computer-ID 406 is maintained to eliminate any ambiguity that may be created by the imported files and the files already present on the second computer system. For example, FIG. 8 shows a case where there are two files named "fileA" each having the same file-ID 410 of "0001," but different computer-IDs 406 of "1001" and "1000" respectively. If, however, their computerID's 406 were identical, the operating system 302 would not know which to retrieve in response to a user request.

Next, the import module 308 assigns each imported file within the FHDB 802 and VOLDB 902 a new volume-ID 412, 504 that is one greater than the largest volume-ID number then currently present within each database. For example, FIGS. 6&7 show how the highest volume-ID 412, 504 currently existing before the import is "8," thus in FIGS. 8&9, "fileA's" original volume-ID 412, 504 of "1"(see FIGS. 4&5) is assigned a new volume-ID 412, 504 of "9" which is one greater than "8." Similarly, the volume-ID 412, 504 associated with "fileB" is changed from "2" to "10" and for "fileZ" from "118" to "11." Even though the volume-IDs 504 are reassigned, the file's original volume-labels 506 remain the same.

To complete the merge operation, the import module 308 renames the imported file's file pathname 408 root directory to correspond to the second computer system's root directory. For example, on the first computer system "fileA's" root directory was "dir1," as shown in FIG. 4; however, once "fileA" was imported onto the second computer system, "fileA's" root directory was changed to "dir3" as shown in FIG. 8.

After the merge operation is completed, the import module 308 reads the non-migrated files to be imported from the tape drive 106 into the primary storage device 104. Simultaneously, the import module 308 loads the imported files' user names and permission lists into the primary storage device 104 for each migrated and non-migrated file. This last step enables the operating system 302 to have knowledge of all imported files.

Figure 11:
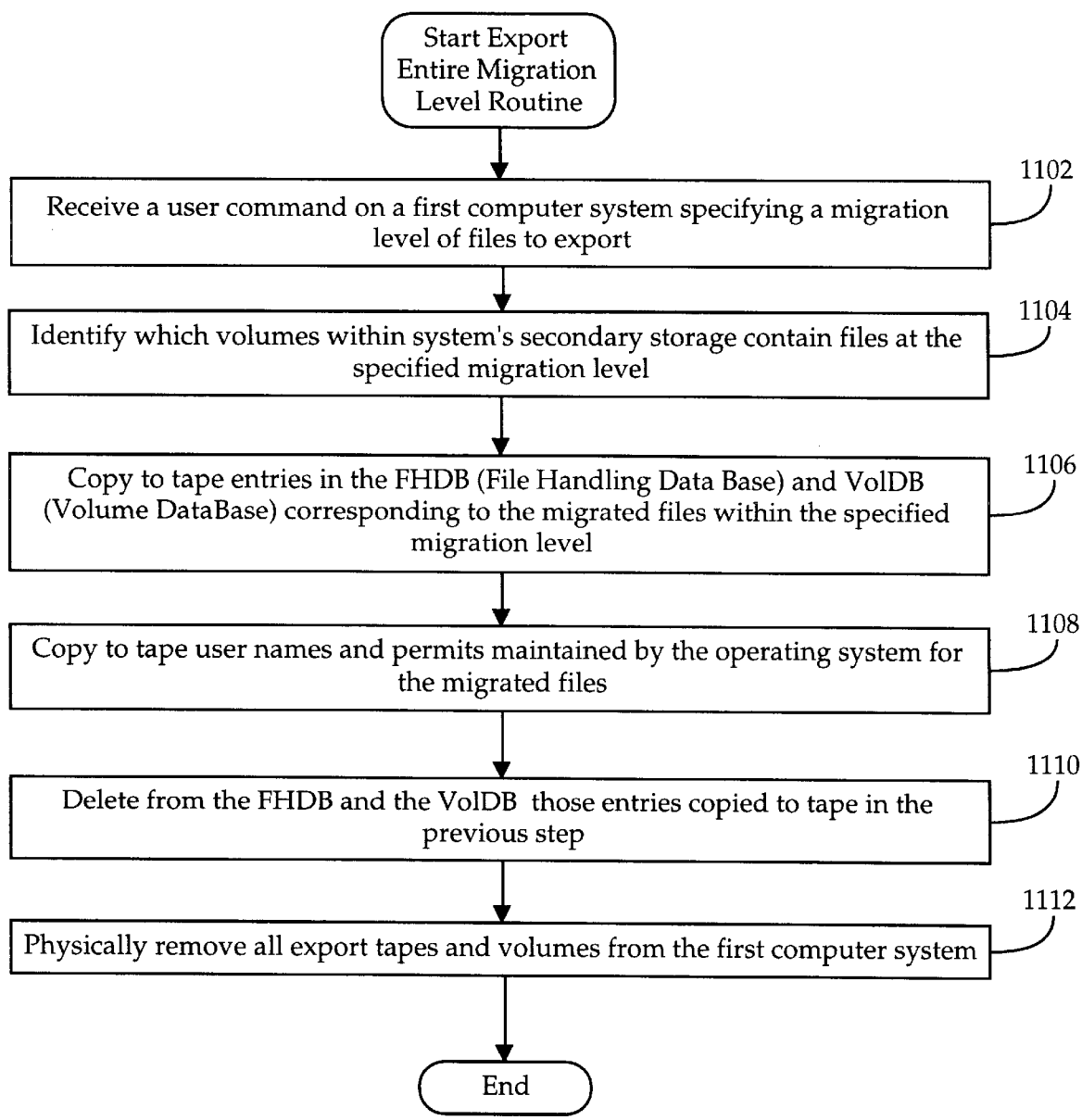
FIG. 11 is a flowchart of a method for exporting an entire migration level from a computer system.

FIG. 11 is a flowchart illustrating a method for exporting all files within a migration level from a computer system. The method begins in step 1102 where the export module 306 receives a user command specifying a migration level of files to export. In step 1104, the export module 306 identifies which volumes within a first computer system secondary storage 108 contain files at the specified migration level. In step 1106, the export module 306 copies to the directory volume entries in the FHDB 402 and VOLDB 502 corresponding to the migrated files within the specified migration level. The export module 306 does not read the files during this copying step. The export module 306 copies to the directory volume user names and permission lists maintained by the operating system 302 for the migrated files, in step 1108. The export module 306, in step 1110, deletes from the FHDB 402 and the VOLDB 502 those entries copied to the directory volume in the previous step. Finally, at step 1112, the export module 306 uses the output device 206 to instruct a user to physically remove all export directory volumes and volumes from the first computer system. After step 1112, the process of exporting an entire migration level is complete.

Figure 12:
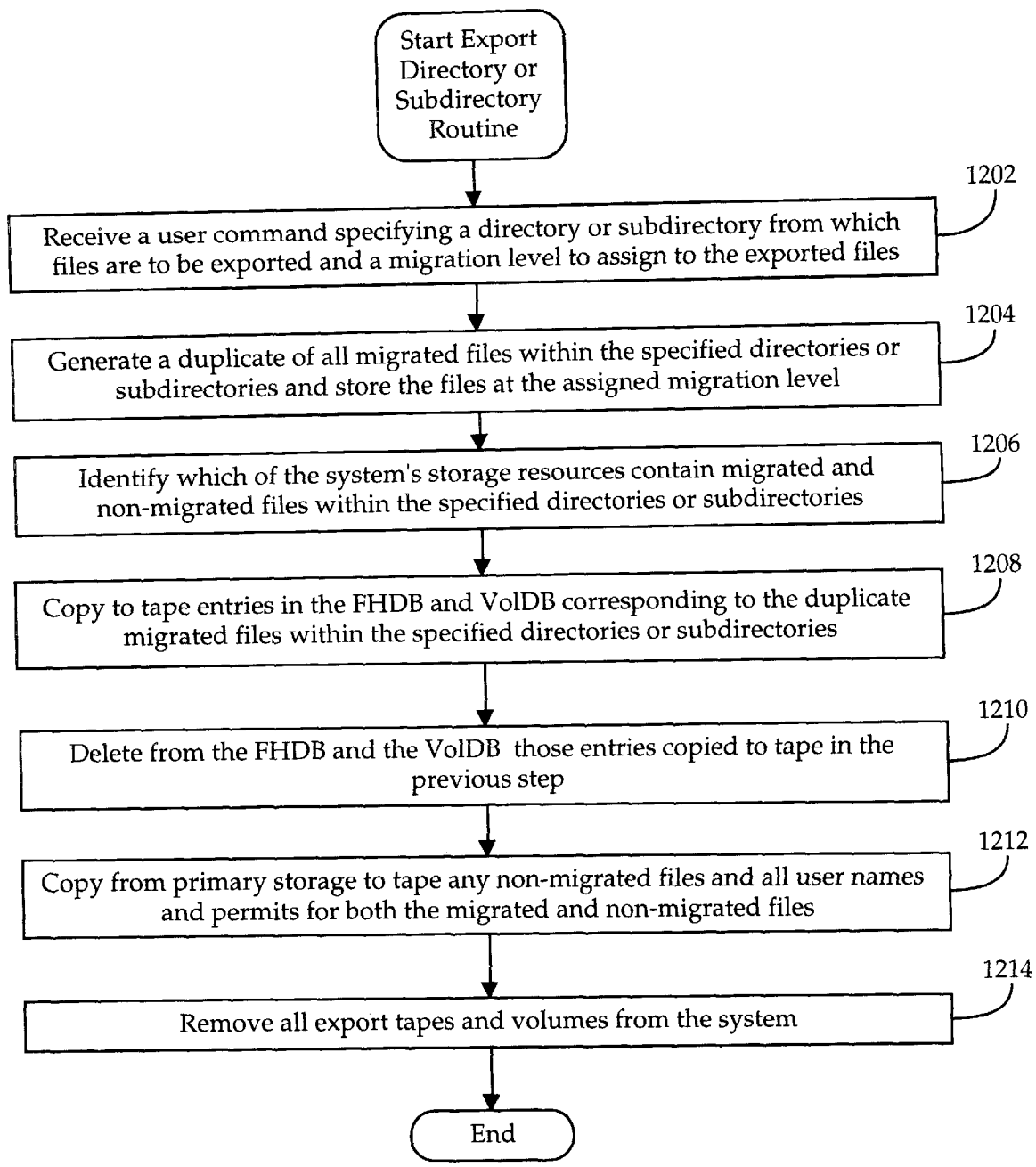
FIG. 12 is a flowchart of a method for exporting an entire directory from a computer system.

FIG. 12 is a flowchart illustrating a method for exporting an entire directory from a computer system 100. The method begins in step 1202 where the export module 306 receives a user command specifying a directory within the first computer system from which files are to be exported and a migration level to assign to the then exported files. In step 1204, the export module 306 generates a duplicate of all migrated files within the specified directories and stores the files at the assigned migration level. The export module 306 identifies which of the first computer system's storage resources 104, 108 contain migrated and non-migrated files within the specified directories, in step 1206. The entries in the FHDB 402 and VOLDB 502 corresponding to the duplicate migrated files within the specified directories are copied to the directory volume at step 1208. In step 1210, the export module 306 deletes from the FHDB 402 and the VOLDB 502 those entries copied to the directory volume in the previous step. Any non-migrated files within the specified directories are copied from the primary storage device 104 to the directory volume at step 1212. Also, in step 1212, user names and permission lists maintained by the operating system 302 for both the migrated and non-migrated files are copied to the directory volume. Lastly, in step 1214, the export module 306 uses the output device 206 to instruct a user to remove all export directory volumes and volumes from the first computer system. The process of directory export ends after step 1214.

Figure 13:
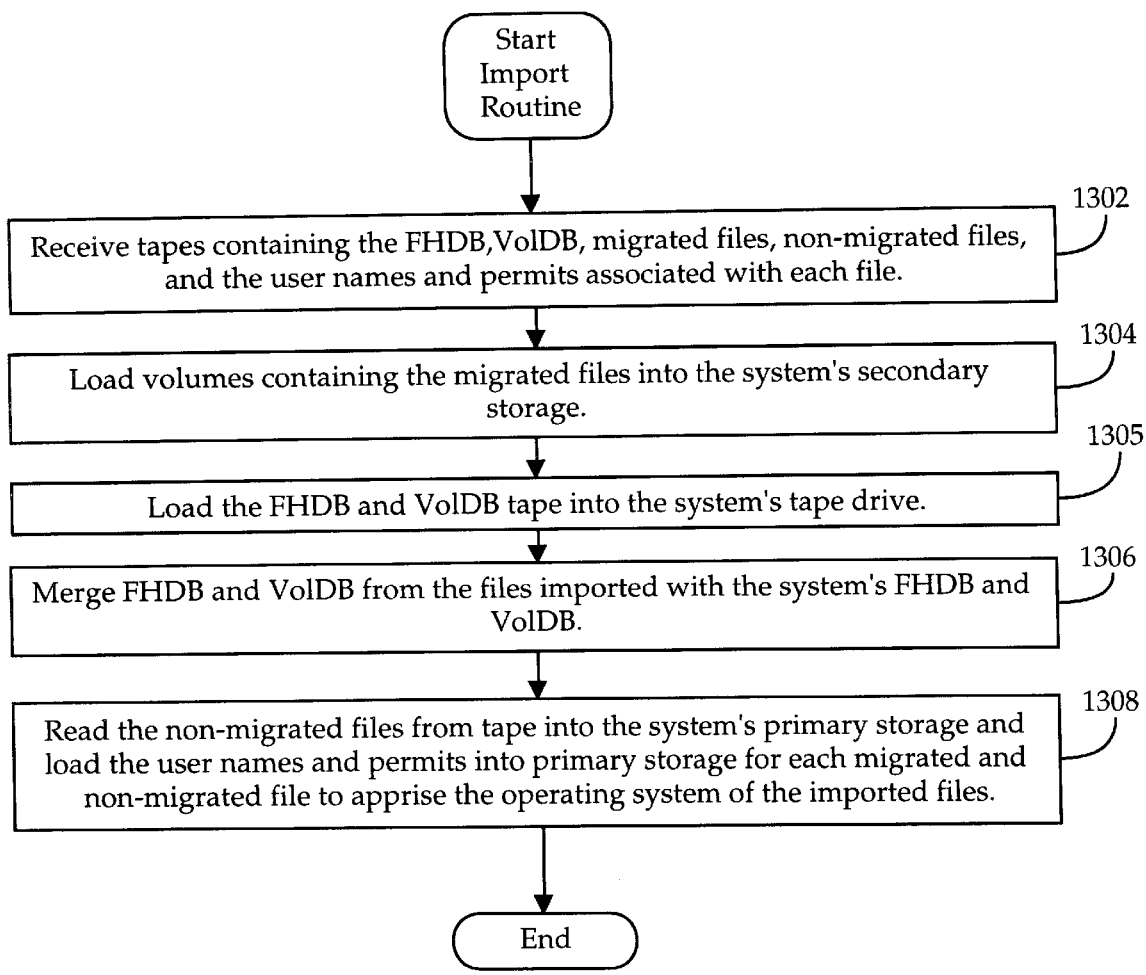
FIG. 13 is a flowchart of a method for importing files into a computer system.

FIG. 13 is a flowchart illustrating a method for importing files into a computer system. The method begins in step 1302, when a user for a second computer system receives directory volumes containing the first computer system's FHDB, VOLDB, migrated files, non-migrated files, and the user names and permission lists associated with each file. In step 1304, the user loads the volumes containing the first computer system's migrated files into the second computer system's secondary storage 108. In step 1305, the user loads the first computer system's FHDB and VOLDB directory volume into the second computer system's tape drive 106. The import module 308 then merges the FHDB and VOLDB for the imported files from the first computer system with the second computer system's FHDB 802 and VOLDB 902, at step 1306. Then in step 1308, the import module 308 reads the first computer system's non-migrated files from the directory volume in the tape drive 106 into the second computer system's primary storage device 104. Also, in step 1308, the import module 308 loads the first computer system's user names and permission lists into primary storage device 104 for each exported file, thereby apprising the operating system 302 of the imported files. The process of importing files ends after step 1308.

Figure 14:
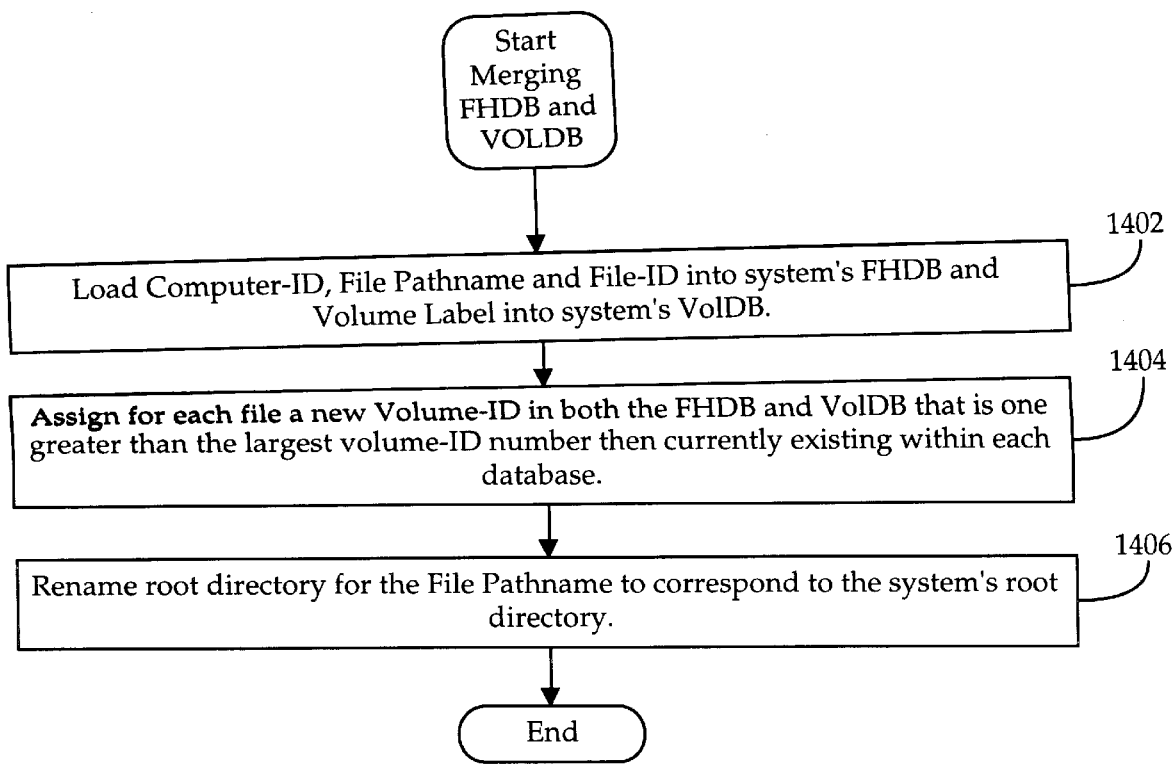
FIG. 14 is a flowchart of a method for merging the FHDB and the VOLDB of two computer systems.

FIG. 14 is a flowchart illustrating a method for merging the FHDB and the VOLDB of two computer systems (step 1306 of FIG. 9). The method begins in step 1402 where the import module 308 loads the computer-ID 406, file pathname 408, and file-ID 410 from the imported migrated files into the second computer system's FHDB 802 and the volume label 506 from the imported migrated files into the second computer system's VOLDB 902. Next, in step 1404, the import module 308 assigns for each migrated file a new volume-ID 412, 504 that is one greater than the largest volume-ID number then present in each database 802, 902. Lastly, in step 1406, the import module 308 renames the root directory in the file pathname 408 for each migrated imported file from the first computer system to correspond to the second computer system's root directory. The process of merging the imported FHDB and VOLDB is complete after step 1406.

While the present invention has been described with reference to certain preferred embodiments, those skilled in the art will recognize that various modifications may be made. Variations upon and modifications to the preferred embodiments are provided for by the present invention, which is limited only by the following claims.

What is claimed is:

1. A computer implemented method for exporting user selected files from a computer system, the method comprising the steps of:
    identifying volumes within removable storage media having the user selected files;
    copying to a directory volume file handles corresponding to the user selected files; and
    deleting the file handles of the user selected files from the computer system, whereby said directory volume and said volumes from said identifying step may be thereafter physically removed from the computer system without having copied the selected files.

2. The method of claim 1, further comprising the step of automatically transferring infrequently used files from a fixed storage medium to volumes of the removable storage media prior to a user selecting files to export.

3. The method of claim 1, wherein the copying step comprises the step of copying to the directory volume a computer-ID, a file pathname and a file-ID corresponding to a selected file.

4. The method of claim 3, further comprising the step of copying to the directory volume a user name and an access permission list from the fixed storage medium corresponding to the selected file.

5. The method of claim 3, further comprising the step of displaying on an output device a volume label corresponding to the selected file.

6. The method of claim 1, in response to a user selected migration level for files to export, further comprising the steps of:
    identifying migrated files within the selected migration level; and
    identifying volumes within the removable storage media containing the migrated files;
    wherein the copying step includes the step of copying to the directory volume a file handle in the fixed storage medium corresponding to each of the migrated files; and
    wherein the removing step includes the step of removing the directory volume and the volumes from the computer system.

7. The method of claim 1, in response to a user selected directory and export migration level for the files to export, further comprising the steps of:
    duplicating migrated files within the selected directory to create duplicate files; storing the duplicate files at the export migration level; and
    identifying volumes within the removable storage media containing the migrated files;
    wherein the copying step includes the steps of:
        copying from the fixed storage medium to the directory volume a file handle corresponding to each of the migrated files; and
        copying to the directory volume non-migrated files within the selected directory; and
    wherein the removing step includes the step of removing the directory volume and the volumes from the computer system.

8. A computer implemented method for importing user selected files to a computer system after a user has loaded volumes containing user selected files into q removable storage media and loaded a directory volume containing file handles corresponding to the selected files into a tape drive, the method comprising the steps of:
    identifying the user selected files on the directory volume; and
    merging the file handle on the directory volume with existing file handles in a fixed storage medium.

9. The method of claim 8, wherein the merging step includes the steps of:
    copying the selected file's computer-ID, file pathname, and file-ID from the directory volume into the fixed storage medium;
    renaming the file pathname's root directory to correspond to those of the existing file handles; and
    assigning a volume-ID to a selected file within the selected files which is one greater than a largest volume-ID assigned within the existing file handles.

10. The method of claim 8, further comprising the step of copying a non-migrated files from the directory volume into the fixed storage medium.

11. The method of claim 8, further comprising the step of:
    copying user names and access permission lists corresponding to the selected files from the directory volume into the fixed storage medium.

12. A system for exporting user selected files from a computer system, the system comprising:
    means for identifying volumes within removable storage media having the user selected files;
    means for copying to a directory volume file handles corresponding to the user selected files; and
    means for deleting the file handles of the user selected files from the computer system, whereby said directory volume and said volumes from said means for identifying may be thereafter physically removed from the computer system without having copied the selected files.

13. The system of claim 12, further comprising means for automatically transferring infrequently used files from a fixed storage medium to volumes of the removable storage media prior to a user selecting files to export.

14. The system of claim 12, wherein the means for copying comprises means for copying to the directory volume a computer-ID, a file pathname and a file-ID corresponding to a selected file.

15. The system of claim 12, in response to a user selected migration level for files to export, further comprising:
   means for identifying migrated files within the selected migration level; and
   means for identifying volumes within the removable storage media containing the migrated files;
   wherein the means for copying includes means for copying to the directory volume a file handle in the fixed storage medium corresponding to each of the migrated files; and
   wherein the means for removing includes means for removing the directory volume and the volumes from the computer system.

16. The system of claim 12, in response to a user selected directory and export migration level for the files to export, further comprising:
   means for duplicating migrated files within the selected directory to create duplicate files;
   means for storing the duplicate files at the export migration level; and
   means for identifying volumes within the removable storage media containing the migrated files;
   wherein the means for copying includes:
      means for copying from the fixed storage medium to the directory volume a file handle corresponding to each of the migrated files; and
      means for copying to the directory volume non-migrated files within the selected directory; and
   wherein the means for removing includes means for removing the directory volume and the volumes from the computer system.

17. A system for importing user selected files to a computer system after a user has loaded volumes containing user selected files into a removable storage media and loaded a directory volume containing file handles corresponding to the selected files into a tape drive, the system comprising:
   means for identifying the user selected files on the directory volume; and
   means for merging the file handle on the directory volume with existing file handles in a fixed storage medium.

18. The system of claim 17, wherein the means for merging includes:
   means for copying the selected file's computer-ID, file pathname, and file-ID from the directory volume into the fixed storage medium;
   means for renaming the file pathname's root directory to correspond to those of the existing file handles; and
   means for assigning a volume-ID to a selected file within the selected files which is one greater than a largest volume-ID assigned within the existing file handles.

19. A computer-usable medium embodying computer-readable program code for causing a computer to export user selected files from a computer system by performing steps comprising:
   identifying volumes within removable storage media having the user selected files;
   copying to a directory volume file handles corresponding to the user selected files; and
   deleting the file handles of the user selected files from the computer system, whereby said directory volume and said volumes from said identifying step may be thereafter physically removed from the computer system without having copied the selected files.

20. The computer-usable medium of claim 19 further comprising program code for performing the step of automatically transferring infrequently used files from a fixed storage medium to volumes of the removable storage media prior to a user selecting files to export.

21. The computer-usable medium of claim 19 wherein the program code for performing the step of copying comprises program code for performing the step of copying to the directory volume a computer-ID, a file pathname and a file-ID corresponding to a selected file.

22. The computer-usable medium of claim 19, in response to a user selected migration level for files to export, further comprising program code for performing the steps of:
   identifying migrated files within the selected migration level; and
   identifying volumes within the removable storage media containing the migrated files;
   wherein the copying step includes the step of copying to the directory volume a file handle in the fixed storage medium corresponding to each of the migrated files; and
   wherein the removing step includes the step of removing the directory volume and the volumes from the computer system.

23. The computer-usable medium of claim 19, in response to a user selected directory and export migration level for the files to export, further comprising program code for performing the steps of:
   duplicating migrated files within the selected directory to create duplicate files; storing the duplicate files at the export migration level; and
   identifying volumes within the removable storage media containing the migrated files;
   wherein the copying step includes the steps of:
      copying from the fixed storage medium to the directory volume a file handle corresponding to each of the migrated files; and
      copying to the directory volume non-migrated files within the selected directory; and
   wherein the removing step includes the step of removing the directory volume and the volumes from the computer system.

24. A computer-usable medium embodying computer-readable program code for causing a computer to import user selected files to a computer system after a user has loaded volumes containing user selected files into a removable storage media and loaded a directory volume containing file handles corresponding to the selected files into a tape drive by performing steps comprising:
   identifying the user selected files on the directory volume; and
   merging the file handle on the directory volume with existing file handles in a fixed storage medium.

25. The computer-usable medium of claim 24 wherein the program code for performing the step of merging comprises program code for performing the steps of:

copying the selected file's computer-ID, file pathname, and file-ID from the directory volume into the fixed storage medium;

renaming the file pathname's root directory to correspond to those of the existing file handles; and assigning a volume-ID to a selected file within the selected files which is one greater than a largest volume-ID assigned within the existing file handles.

26. A system for exporting migrated files, the system comprising:

a removable storage medium including removable volumes having files;

a fixed storage medium including file handles corresponding to the files;

a tape drive including a directory volume;

an input device for specifying files to export in response to a user command; and an export module, coupled to the removable storage medium, the fixed storage medium, the tape drive and the input device, for identifying the volumes of the removable storage medium containing the exported files, copying to the directory volume exported file handles from within the file handles corresponding to the exported files, and deleting the exported file handles from the computer system, in response to the specified files received from the input device, whereby said directory volume and said volumes may be thereafter physically removed from the computer system.

27. The system of claim 26, wherein the exported file handles includes a computer-ID, a file pathname, a file-ID and a volume-ID.

28. A system for importing migrated files, the system comprising:

a removable storage medium including removable volumes having files, whereby volumes containing imported files may be physically loaded into the removable storage medium;

a fixed storage medium including a file handles corresponding to the files;

a tape drive including a directory volume having imported file handles corresponding to the imported files;

an input device for initiating an import operation in response to a user command; and an import module, coupled to the removable storage medium, the fixed storage medium, the tape drive and the input device, for merging the imported file handles with the file handles.

29. The system of claim 28, wherein an import file handle includes a computer-ID, a file pathname, a file-ID and a volume-ID.

30. The system of claim 29, wherein the import module further:

copies the import file handles from the directory volume into the fixed storage medium;

renames the file pathname's root directory for the import file handles to correspond to those of the file handles; and assigns a new volume-ID to each import file handle which is one greater than a largest volume-ID assigned within the file handles.

* * * * *